US007281692B2

(12) United States Patent
Worthington

(10) Patent No.: US 7,281,692 B2
(45) Date of Patent: Oct. 16, 2007

(54) STEAM STRIPPERS

(76) Inventor: James Thomas Anthony Worthington, 19 Hubtley Rd., Cheadle Hulme, Stockport (GB) SK3 ORP ( * ) Notice: Subject to any disclaimer, the term of this patent is extended or adjusted under 35 U.S.C. 154(b) by 102 days.

(21) Appl. No.: 10/546,473

(22) PCT Filed: Jan. 19, 2004

(86) PCT No.: PCT/GB2004/000211

§ 371 (c)(1), (2), (4) Date: Aug. 22, 2005

(87) PCT Pub. No.: WO2004/078369

PCT Pub. Date: Sep. 16, 2004

(65) Prior Publication Data

US 2006/0065810 A1 Mar. 30, 2006

(30) Foreign Application Priority Data

Mar. 8, 2003 (GB) ................................ 0305369.1
May 31, 2003 (GB) ................................ 0312511.9

(51) Int. Cl.
*F16M 11/00* (2006.01)

(52) U.S. Cl. ...................... 248/161; 248/157; 248/159; 248/622; 248/121; 248/125.1

(58) Field of Classification Search ................ 248/622, 248/161, 159, 157
See application file for complete search history.

(56) References Cited

U.S. PATENT DOCUMENTS

| | | | | | |
|---|---|---|---|---|---|
| 1,879,826 | A | * | 9/1932 | Shaffer | 126/271.1 |
| 2,164,609 | A | * | 7/1939 | Cusick | 248/408 |
| 2,273,813 | A | | 2/1942 | Barber | |
| 2,332,240 | A | * | 10/1943 | Lavalley | 254/116 |
| 2,377,949 | A | * | 6/1945 | McMenamy | 248/125.8 |
| 2,496,794 | A | * | 2/1950 | Hoch | 248/408 |
| 2,685,876 | A | * | 8/1954 | Sanderson | 126/271.1 |
| 2,760,745 | A | * | 8/1956 | McCleery | 248/413 |
| 2,793,286 | A | * | 5/1957 | Stiffel | 362/431 |
| 4,522,394 | A | * | 6/1985 | Broussard | 473/483 |
| 4,856,929 | A | * | 8/1989 | Smahlik et al. | 403/297 |
| 5,011,174 | A | * | 4/1991 | Ross-Clunis | 280/287 |
| 5,604,961 | A | * | 2/1997 | Cole | 24/306 |
| 6,412,737 | B1 | * | 7/2002 | Minagawa | 248/166 |
| 6,609,686 | B2 | * | 8/2003 | Malizia | 248/125.8 |
| 6,663,060 | B1 | * | 12/2003 | Gifford, Sr. | 248/161 |
| 2002/0050546 | A1 | * | 5/2002 | Johnson et al. | 248/161 |

FOREIGN PATENT DOCUMENTS

| | | |
|---|---|---|
| FR | 2283786 | 4/1976 |

* cited by examiner

*Primary Examiner*—Carl D. Friedman
*Assistant Examiner*—Nkeisha J. Dumas
(74) *Attorney, Agent, or Firm*—Collard & Roe, P.C.

(57) ABSTRACT

A steam stripper (14) is provided with a support comprising a pole (16) comprised of connected sections (17, 18) and (19). The upper sections 17 and (18) are connected by a resilient spring apparatus (23), and the support is connected to a handle (20) of the stripper by a T-shaped rest (22), having a strap (21) for securing the handle to the rest. In one embodiment the support comprises an attachment (42) for a paint roller extension pole (51).

5 Claims, 3 Drawing Sheets

STEAM STRIPPERS

CROSS REFERENCE TO RELATED APPLICATIONS

Applicants claim priority under 35 U.S.C. §119 of Great Britain Application No. 0305369.1 filed on Mar. 8, 2003 and Great Britain Application No. 0312511.9 filed on May 31, 2003. Applicants also claim priority under 35 U.S.C. §365 of PCT/GB2004/000211 filed on Jan. 19, 2004. The international application under PCT article 21 (2) was published in English.

This invention relates to improvements in steam strippers which are used to moisten and heat decorative wall and ceiling covers such as wallpapers and Artex for removal of the covers using a spatula or scraper.

A steam stripper comprises steam generating apparatus typically comprising a bulky body containing a water reservoir and an electric heater, mounted on wheels or castors for mobility. The steam generator apparatus is connected by a steam pipe to a steam plate which comprises a rectangular plate, typically 30 or 40 cms by 50 or 60 cms with a rim enclosing a shallow volume to which steam is fed, to be applied to an external flat surface such as a wall or ceiling for steaming and moistening decorative paper or Artex thereon for removal using a spatula or scraper. The steam plate is provided with a handle for holding the plate in contact with the wall or ceiling surface.

In the case of a ceiling, particularly a high ceiling, with this type of steam plate, it is necessary for the user to not only stand possibly precariously on a step ladder, but also to adopt a strained position holding the steam plate under pressure against the ceiling and looking upwards. This causes discomfort and fatigue and is potentially hazardous as it is performed at a height above the floor, and with the possibility of scalding condensed steam continually dripping onto the user.

It is an object of this invention to provide steam stripper apparatus which includes means for supporting the steam plate so as to avoid or reduce uncomfortable fatigue or dangerous positions in using the steam plate on ceiling surfaces.

According to the invention, in combination with a steam plate in steam stripper apparatus, there is provided a support means for the steam plate comprising a pole member adapted for engagement with the steam plate at one end, and for engagement with a floor surface at the other end.

The pole member preferably includes a resilient means to enable partial retraction thereof for engagement and disengagement with the steam plate, and to accommodate differences in ceiling height.

The pole member may comprise two or more interconnectable sections which can be dismounted for carriage. In one embodiment, a support for a steam stripper may be provided as an attachment for a standard paint roller extension pole. This may be provided as a shank having a T-shaped rest with a strap, and incorporating a spring device, the shank being terminated with a female screw connector for attachment to a paint roller extension pole in place of the paint roller handle.

The resilient means may comprise a sleeve or tube housing a compression spring, the ends of which are engaged by the ends of upper and lower pole sections. A tube may extend through the spring, an end of the tube being fixed in the end of one of the pole sections, the other end of the tube extending freely into the other pole section to maintain the lateral alignment and compressive strength of the pole.

A preferred embodiment of support means for a steam stripper apparatus is further described hereinafter with reference to the accompanying drawings, wherein.

Figure 1:
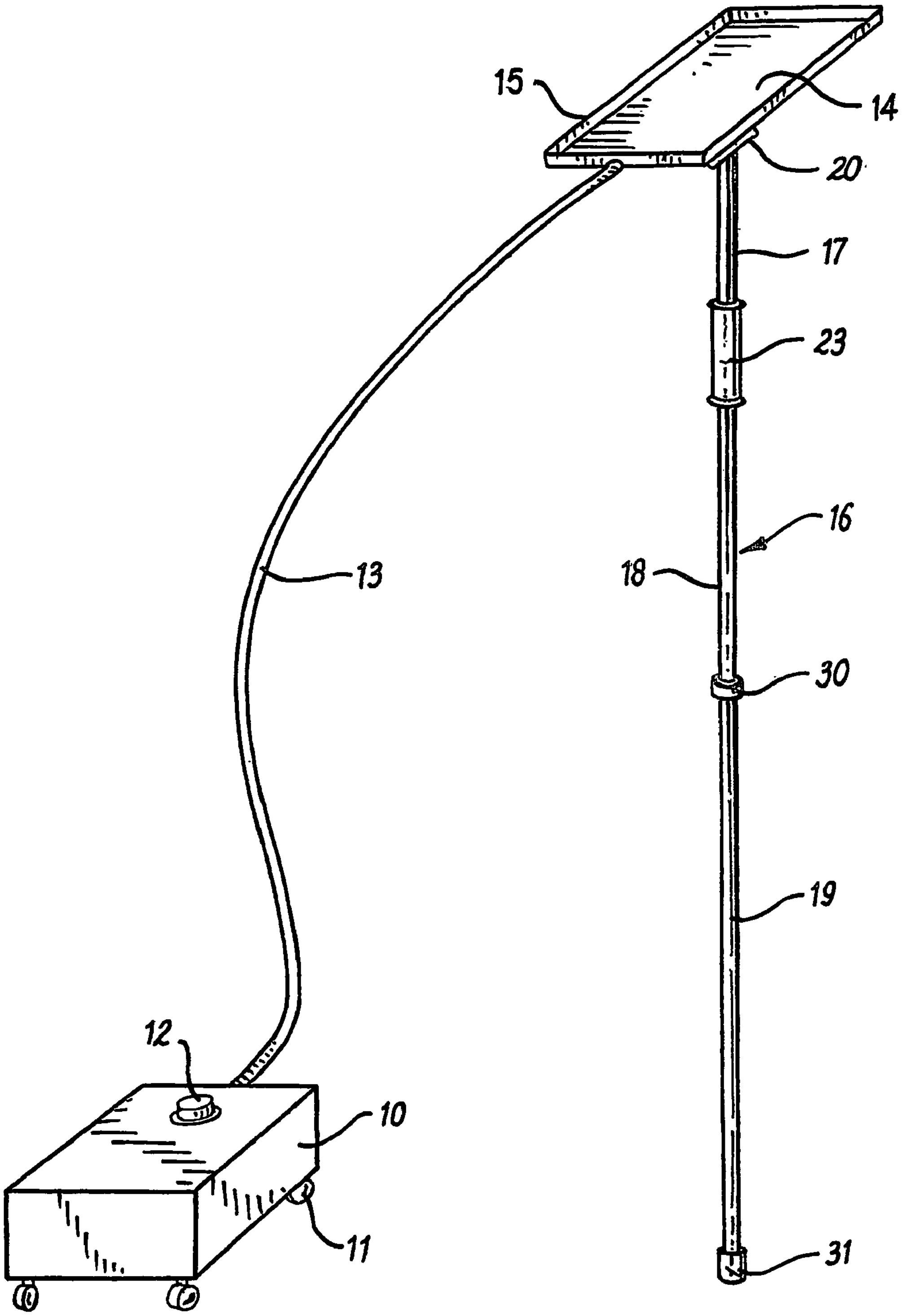
FIG. 1 is an overall view illustrating a steam stripper apparatus, provided with a support means in accordance with the invention for the steam plate.
Figure 2:
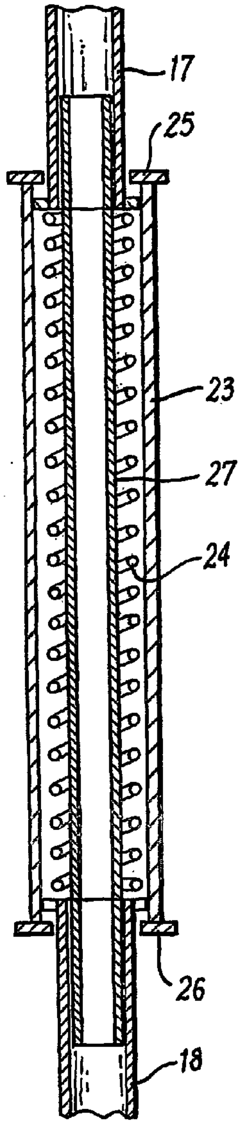
FIG. 2 is a detail view of resilient means embodied in the support means.

As shown in FIG. 1 a steam stripper apparatus comprises a steam generating unit 10, mounted on castors 11 for mobility and containing a water reservoir which can be replenished via a filler cap 12, and an e.g. electrically heated boiler for producing steam. Steam is conducted along a pipe or hose 13 to a steam plate 14 which comprises a rectangular member having shallow side walls 15 to define a volume in contact with a surface such as a wall or ceiling. The steam plate brings steam and condensed water into contact with any paper cladding or Artex which is to be removed from the surface. The steam and warm water act to soften the paper or Artex and weaken the adhesive bond, facilitating subsequent removal of the paper or Artex from the surface using a spatula or scraper.

In FIG. 1, the steam plate 14 is shown applied to a ceiling, and it is supported in accordance with the invention by a support means consisting of a pole 16, which extends from the steam plate to the floor and serves to support the steam plate 14 and remove its weight from a person using the steam plate during its use.

Figure 3:
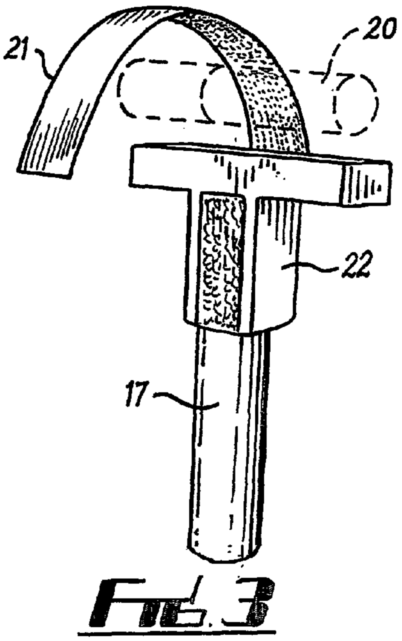
FIG. 3 is a detailed view of the upper end of the support means.

The pole 16 is comprised of three sections, 17, 18 and 19. Section 17 is connected to a handle 20 of the steam plate as shown in FIG. 3, by a Velcro strap 21 which is connected to a head piece 22 on the top end of section 17. Sections 17 and 18 are connected by a sleeve 23 which encloses a compression spring 24 the ends of which are seated on respective end flanges 25, 26 of sections 17, 18, thus enabling the length of the pole 16 to be shortened by pushing the sections 17, 18 together, which facility can used to position the pole, and thus when in use.

A guide member 27 is force fitted in the lower end of Section 17 and is freely movable in the upper end of Section 18 and passes concentrically within the spring 24 and serves to ensure that the Sections 17, 18 do not become separated.

Figure 4:
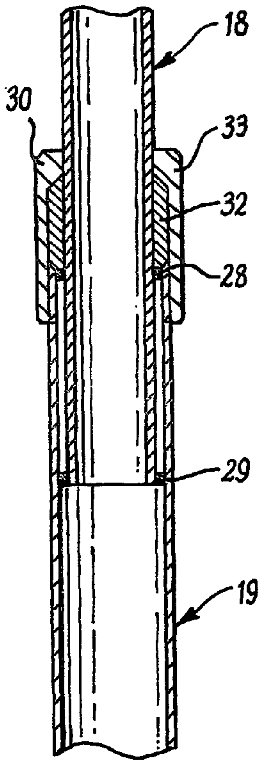
FIG. 4 is a detailed view of a connection between sections of the support means.

Sections 18 and 19, which have respective end flanges 28 and 29, are connected by means of a locking collar 30, which comprises a split sleeve 32, and threaded locking collar mechanism 33, which when tightened locks section 18 in the required position to accommodate different ceiling heights. The end flanges 28, 29, retain the sections 18, 19, in a telescopic relationship, the top end of section 19 being externally threaded to accommodate the locking collar 32, see FIG. 4.

Figure 5:
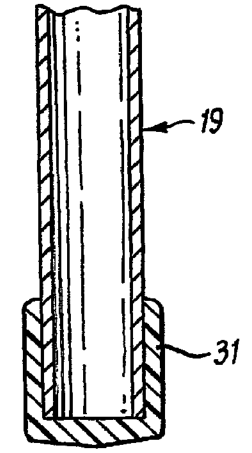
FIG. 5 is a detailed view of the front or lower end of the support means.

As shown in FIG. 5, the foot of the pole 16 provided by the end of Section 19 is provided with a rubber or plastics shoe or tip 31 which helps to minimise wear or abrasion to floor coverings, and also prevents the pole from slipping.

Figure 6:
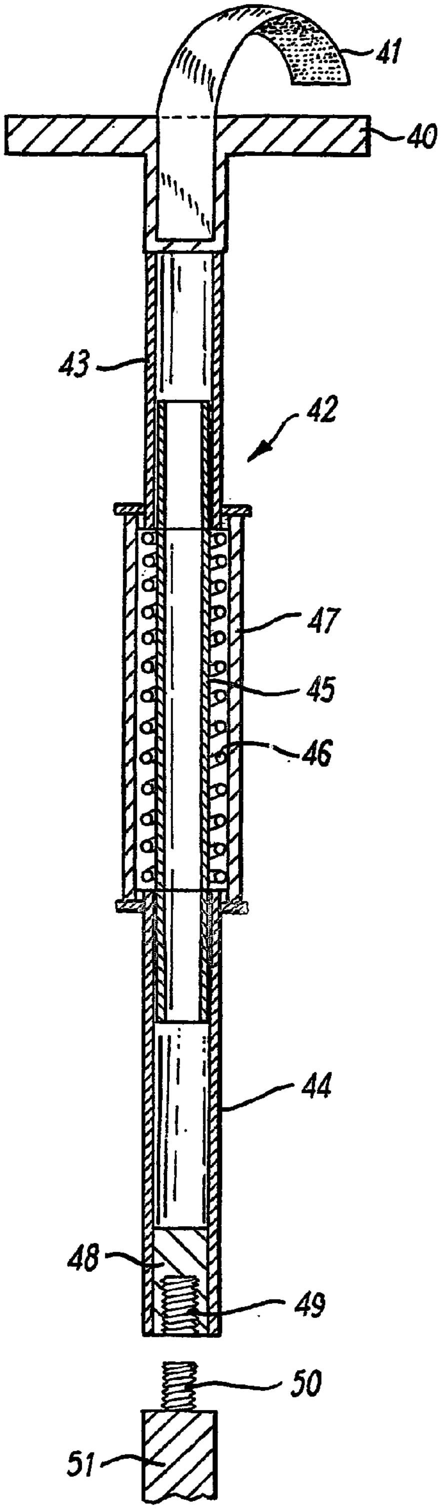
FIG. 6 is a longitudinal section of a further embodiment of support means.

The support shown in FIG. 6 comprises a T-shaped head 40, which may act as a saddle for a handle of a steam plate, and is furnished with a Velcro strap 41 by means of which the handle can be secured to the head 40. The head 40 is mounted on a shank 42 comprising a top end part 43 and a bottom end part 44. The end parts are slidable in a reduced diameter inner tube 45 which acts as a core for a coil spring 46 within an outer sleeve 47.

The spring 46 is seated at either end on the ends of the end parts 43 and 44 and can be compressed by pressing the end parts towards each other. As in the first application this allows length adjustment and helps to press the steam plate against a surface which is being treated.

The free end of the bottom end part 44 is closed by a force fit body 48 which is provided with an axial female threaded bore 49 which is adjusted to receive a complementarily threaded spigot 50 on the end of an extension rod 51 such as the first of one or more sections of a paint roller extension pole.

Figure 7:
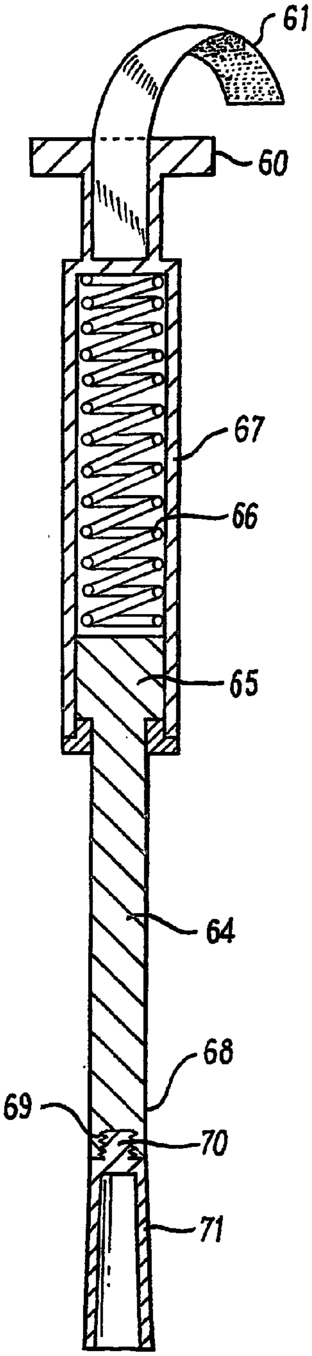
FIG. 7 is a similar view of a variant of the FIG. 6 embodiment.

FIG. 7 shows a variant on the FIG. 6 embodiment wherein the T-shaped head 60 with strap 61 is connected directly to an external cylinder 67 which houses a compression spring 66. The lower part of the attachment comprises a rod 64, with a head 65 received as a slidable piston within the cylinder 67, and biased to the end position shown to extend the rod 64 fully from the cylinder 67. The end 68 of the rod 64 has a screw threaded socket 69 to accommodate a threaded spigot 70 on the end of an extension rod 71.

This achieves a further option and thus versatility in the use of the concept underlying the invention described in FIGS. 1 to 5.

The invention is not restricted to the details of the preferred embodiment described, and in particular the member and lengths of sections may be varied to suit for example ceiling heights and carrying space.

The invention is not restricted to the details of the preferred embodiments illustrated and described, and other materials and mounting means within the scope of the invention may be used.

The invention claimed is:

1. A support means for a steam plate in a steam stripper apparatus, said support means comprising a pole member adapted for engagement with the steam plate at an upper end of the pole member, and for engagement with a floor surface at a lower end of the pole member;

said pole member comprising an upper section, an intermediate section and a lower section, said upper section having means for connection to the steam plate;

said upper and intermediate sections being connected by ends thereof being telescopically received in a sleeve member incorporating a compression spring, the ends of the compression spring bearing on the respective ends of the upper and intermediate sections received in the sleeve;

said intermediate and lower sections being connected so as to be disconnectable; and said means for connection of said upper section to said steam plate comprising a T-shaped head to which a handle of a steam plate is connectable by means of a strap attached to one side of the head, and securable to the other side of the head.

2. The support means according to claim 1, wherein said intermediate section and said lower section are connected by a locking collar on a lower end of the intermediate section or an upper end of the lower section, a free end of the intermediate section or the lower section being telescopically receivable within said locking collar.

3. The support means according to claim 1, wherein said intermediate section and said lower section are connected by a screw threaded axial spigot on a lower end of the intermediate section or an upper end of the lower section, said spigot being receivable in a complementarily threaded axial bore in a free end of the intermediate section or the lower section.

4. The support means according to claim 1, wherein said strap is provided with a contact surface forming one component of a loop and pile fastener, the other component of which is provided on said other side of said head.

5. The support means according to claim 1, wherein a lower end of said lower section is provided with a rubber or plastic show or tip.

* * * * *